(12) United States Patent
Kisting

(10) Patent No.: US 9,968,037 B2
(45) Date of Patent: May 15, 2018

(54) SHORT CHAIN HYDROCARBON COMBUSTOR AND CARBON DIOXIDE GENERATOR

(71) Applicant: Michael Kisting, Bennett, CO (US)

(72) Inventor: Michael Kisting, Bennett, CO (US)

( * ) Notice: Subject to any disclaimer, the term of this patent is extended or adjusted under 35 U.S.C. 154(b) by 389 days.

(21) Appl. No.: 14/953,715

(22) Filed: Nov. 30, 2015

(65) Prior Publication Data

US 2016/0286737 A1 Oct. 6, 2016

Related U.S. Application Data

(60) Provisional application No. 62/143,490, filed on Apr. 6, 2015.

(51) Int. Cl.
*A01G 9/24* (2006.01)
*A01G 9/18* (2006.01)

(52) U.S. Cl.
CPC .............. *A01G 9/246* (2013.01); *A01G 9/18* (2013.01); *Y02A 40/268* (2018.01)

(58) Field of Classification Search
CPC .................................... A01G 9/24; A01G 9/18
USPC ............................................ 431/13, 12, 158
See application file for complete search history.

(56) References Cited

U.S. PATENT DOCUMENTS 9,756,793 B2 * 9/2017 Im ........................ A01G 9/245

FOREIGN PATENT DOCUMENTS

| JP | 20033134945 A | * | 5/2003 | ............... A01G 9/24 |
| JP | 2014172815 A | * | 9/2014 | ............... C01B 3/38 |
| WO | WO 2014010561 A1 | * | 1/2014 | ............... A01G 9/18 |

* cited by examiner

*Primary Examiner* — Gregory Huson
*Assistant Examiner* — Nikhil Mashruwala
(74) *Attorney, Agent, or Firm* — Williams Intellectual Property; Benjamin F. Williams

(57) ABSTRACT

A short-chain hydrocarbon combustor and carbon dioxide generator installable into an existing ventilation system venting an interior grow space effects combustion of a gas supply to produce carbon dioxide on demand and maintain a desired atmospheric concentration of carbon dioxide interior the grow space. Exhaust gas producible at a high-efficiency burner is drawn through a boustrophedonic flue and passed through each of a first and second heat exchanger wherein heat is conducted into a vented airflow traveling through the existing ventilation system for discard exterior to the grow space. Condensate precipitated during cooling is collectable at a water trap, and drainable for use in the grow space. Carbon dioxide enriched exhaust gas is thereby cooled by an at least 95% reduction in heat previous to emission into the grow space. Temperature and humidity are thereby controllable within desired ranges and yield maximization enabled.

10 Claims, 3 Drawing Sheets

SHORT CHAIN HYDROCARBON COMBUSTOR AND CARBON DIOXIDE GENERATOR

CROSS-REFERENCE TO RELATED APPLICATIONS

This nonprovisional application claims the benefit of U.S. provisional application No. 62/143,490 filed on Apr. 6, 2015

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of carbon dioxide generators are known in the prior art. However, what is needed is a short chain hydrocarbon combustor and carbon dioxide generator that is installable into open communication with an existing ventilation system operative to vent heat from an indoor grow space, said short chain hydrocarbon combustor and carbon dioxide generator enabling air-to-air heat exchange at each of a first heat exchanger and a second heat exchanger, wherein at least 95% of heat of combustion is transferred from exhaust gas into airflow routed through the ventilation system exterior to the grow space and water vapor is condensable and collectable from said exhaust gas whereby cooled carbon dioxide is producible into the grow space upon demand by action of a demand relay disposed in operational communication with a gas valve and an igniter, said carbon dioxide producible at desired quantities without appreciably effecting the thermal load and relative humidity occurent in the operative grow space.

FIELD OF THE INVENTION

The present invention relates to a short chain hydrocarbon combustor and carbon dioxide generator, and more particularly, to a short chain hydrocarbon combustor and carbon dioxide generator carbon dioxide generator that is installable into open communication with an existing ventilation system operative to vent heat from an indoor grow space, said short chain hydrocarbon combustor and carbon dioxide generator enabling air-to-air heat exchange at each of a first heat exchanger and a second heat exchanger, wherein at least 95% of heat of combustion is transferred from exhaust gas into airflow routed through the ventilation system exterior to the grow space and water vapor is condensable and collectable from said exhaust gas whereby cooled carbon dioxide is producible into the grow space upon demand by action of a demand relay disposed in operational communication with a gas valve and an igniter, said carbon dioxide thereby producible at desired quantities without appreciably effecting the thermal load and relative humidity of the operative grow space.

SUMMARY OF THE INVENTION

The general purpose of the short chain hydrocarbon combustor and carbon dioxide generator, described subsequently in greater detail, is to provide a short chain hydrocarbon combustor and carbon dioxide generator which has many novel features that result in a short chain hydrocarbon combustor and carbon dioxide generator which is not anticipated, rendered obvious, suggested, or even implied by prior art, either alone or in combination thereof.

The present short chain hydrocarbon combustor and carbon dioxide generator has been devised to produce carbon dioxide ($CO_2$) on demand by combustion of short chain hydrocarbons—such as methane, ethane, propane, and butane—said short chain hydrocarbons available and readily deliverable via existing urban infrastructure. The present short chain hydrocarbon combustor and carbon dioxide generator is readily installable into a ventilation system operative to cool an indoor grow space, whereby $CO_2$ is readily producible, on demand, to maintain a $CO_2$ rich atmosphere appropriate for maximizing yield in a given interior volume, and heat produced from combustion is readily transferred away from the grow space by airflow circulating through the existing ventilation system to which the present short chain hydrocarbon combustor and carbon dioxide generator is readily installed.

Thus the present short chain hydrocarbon combustor and carbon dioxide generator presents an efficient, self-contained unit easily installable into an existing ventilation system to produce $CO_2$ at desired quantities sizeable to increase yield occurrent at an indoor grow space. Transfer of heat produced by combustion is effected by air-to-air transfer through conductive heat exchange at a first heat exchanger and a second heat exchanger, whereby heat is reduced by 95% and $CO_2$ is introducible into the grow space without adding to the thermal load of conditioning the interior grow space. This is particularly significant in reducing costs of production as certain species of flowering plants tend to etoliate (and thus decrease yield) in environments where temperatures remain above desirable thresholds.

The present short chain hydrocarbon combustor and carbon dioxide generator, therefore, includes a high efficiency burner disposed interior to a sealed combustion chamber. Combustion is effective when a demand relay, disposed in operative communication with at least one control and at least one sensor, activates a gas valve and effects action of an igniter whereby short chain hydrocarbons are combusted at the burner. Oxygen is introduced into the combustion chamber from airflow directed from the ventilation system, or from an intake port disposed in open communication with the grow space or an ambient volume proximal thereto.

By the term "short chain hydrocarbon" is meant methane or propane, as commercially available and readily accessible gases having requisite infrastructure for delivery to point of combustion, but ethane and butane are also contemplated for use combustible with the present invention. Appropriate stoichiometry enables accurate configuration of $CO_2$ production depending on the fuel combusted, and the gas valve is thereby readily controllable by action of the demand relay appropriately responsive to an atmospheric concentration of $CO_2$ sensed within the grow space.

$CO_2$ and water is thus produced at the high efficiency burner as exhaust gas, drawn into a boustrophedonic flue disposed for collection of said exhaust gas produced at the burner. The boustrophedonic flue is contemplated to include at least one bend. A fan, disposed operative in an exhaust manifold distally disposed relative the burner, maintains a negative pressure interior to the boustrophedonic flue whereby exhaust gas is induced into the flue, through each of a first heat exchanger and a second heat exchanger, into the exhaust manifold, and out an exhaust port into the grow space, as will be described subsequently.

The boustrophedonic flue includes thermally conductive materials wherein heat is conducted out of exhaust gas drawn proximal said thermally conductive materials and transferred into airflow carried across said flue by action of the ventilation system to which the present device is installed. Approximately 70% of the heat borne in the exhaust gas is transferred into airflow of the ventilation system at the first heat exchanger.

The cooled exhaust gas is thence introduced through a second heat exchanger, wherein a plurality of fins is disposed to increase surface area for conduction of heat out of the exhaust gas into the airflow of the ventilation system. It is contemplated that a further 25% reduction in heat is effected at the second heat exchanger whereby a total of at least 95% of heart effected by combustion is transferred from the exhaust gas previous to introduction of said exhaust gas into the grow space.

It should be noted that the second heat exchanger is disposed upstream the ventilation system relative the disposition of the first heat exchanger, whereby greater transfer of heat is effected, airflow first effecting heat transfer at the second heat exchanger (wherein the exhaust gas is already appreciably cooled) and then effecting heat transfer at the first heat exchanger (wherein a higher change in temperature readily effects heat transfer from the exhaust gas into the airflow even subsequent passage of said airflow over the second heat exchanger).

Water vapor is condensable at a water trap disposed in the exhaust manifold whereby condensate is drainable for collection at a wastewater conduit. Thus humidity is controllable, and use of the present short chain hydrocarbon combustor and carbon dioxide generator does not readily effect relative humidity in the grow space nor necessitate reconfiguration of the ventilation system subsequent installation and repeated use. The present short chain hydrocarbon combustor and carbon dioxide generator, therefore, is configured to have a minimal footprint on operative conditions prevalent in the grow space to which it is installed, with the exception of increasing concentration of atmospheric CO2.

CO2 is thus producible into the grow space through the exhaust port on demand and regulated by the demand relay controlling the gas valve. Heat is effectively transferred into airflow exiting the grow space through the ventilation system and excluded therefrom by some thermal barrier separating the conditioned grow space from exterior space (such as insulated walls, for example). Water vapor producible at combustion is condensable and collectable for use, or discard, as desired.

The present short chain hydrocarbon combustor and carbon dioxide generator therefore is additional integrated into an operative ventilation system, as commonly used to vent heat generated from operation of grow lights (such as High Pressure Sodium and Metal Halide lamps, for example) or as required to vent an indoor grow space appropriately, without additional configurations resulting, whereby production of CO2 at desired quantities is producible on demand and remains controllable to maintain a desired atmospheric concentration of CO2 appropriate to maximize yield within the grow space.

Thus has been broadly outlined the more important features of the present short chain hydrocarbon combustor and carbon dioxide generator so that the detailed description thereof that follows may be better understood and in order that the present contribution to the art may be better appreciated.

For better understanding of the short chain hydrocarbon combustor and carbon dioxide generator, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
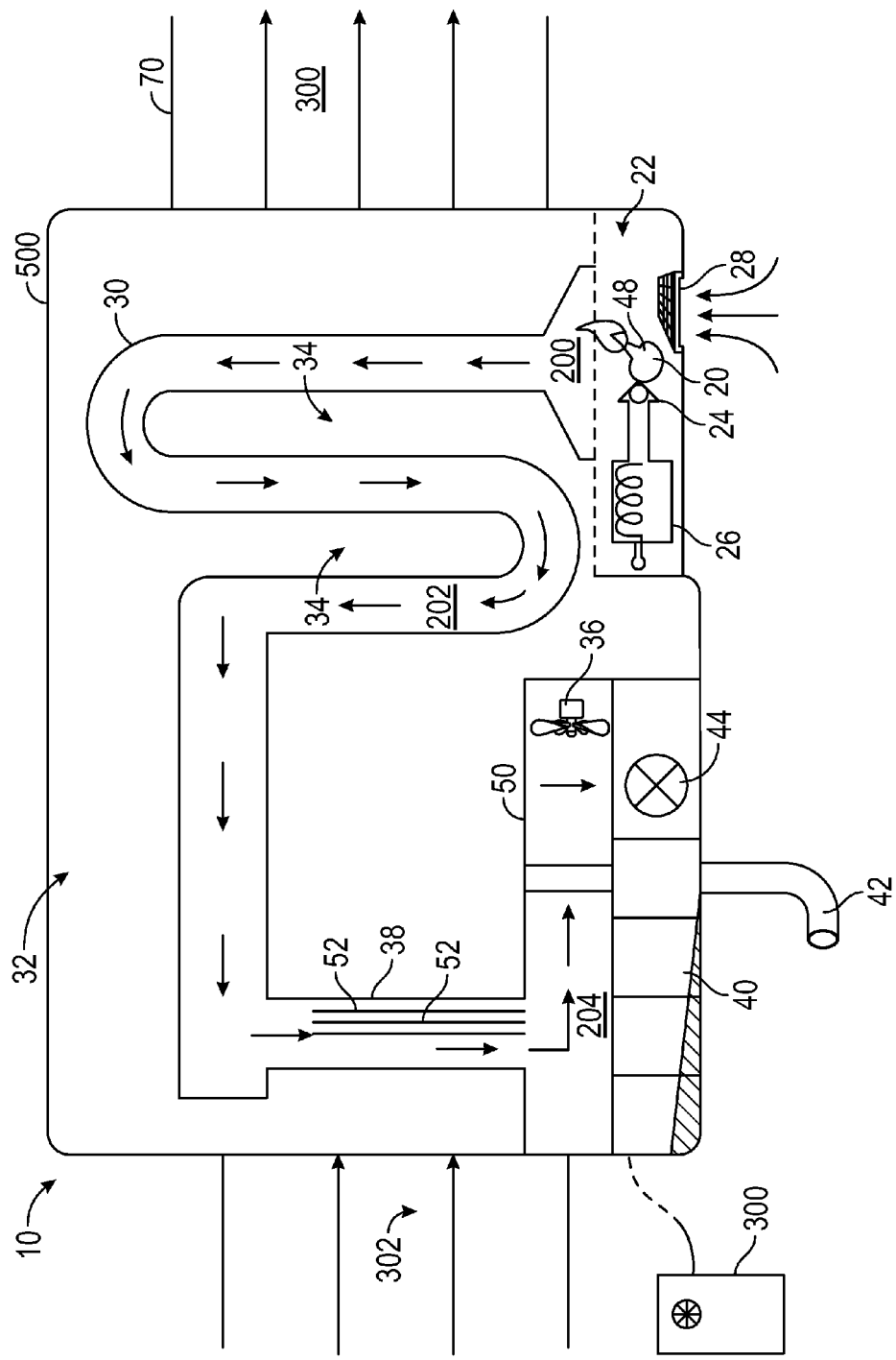
FIG. 1 is a diagrammatic view.
Figure 2:
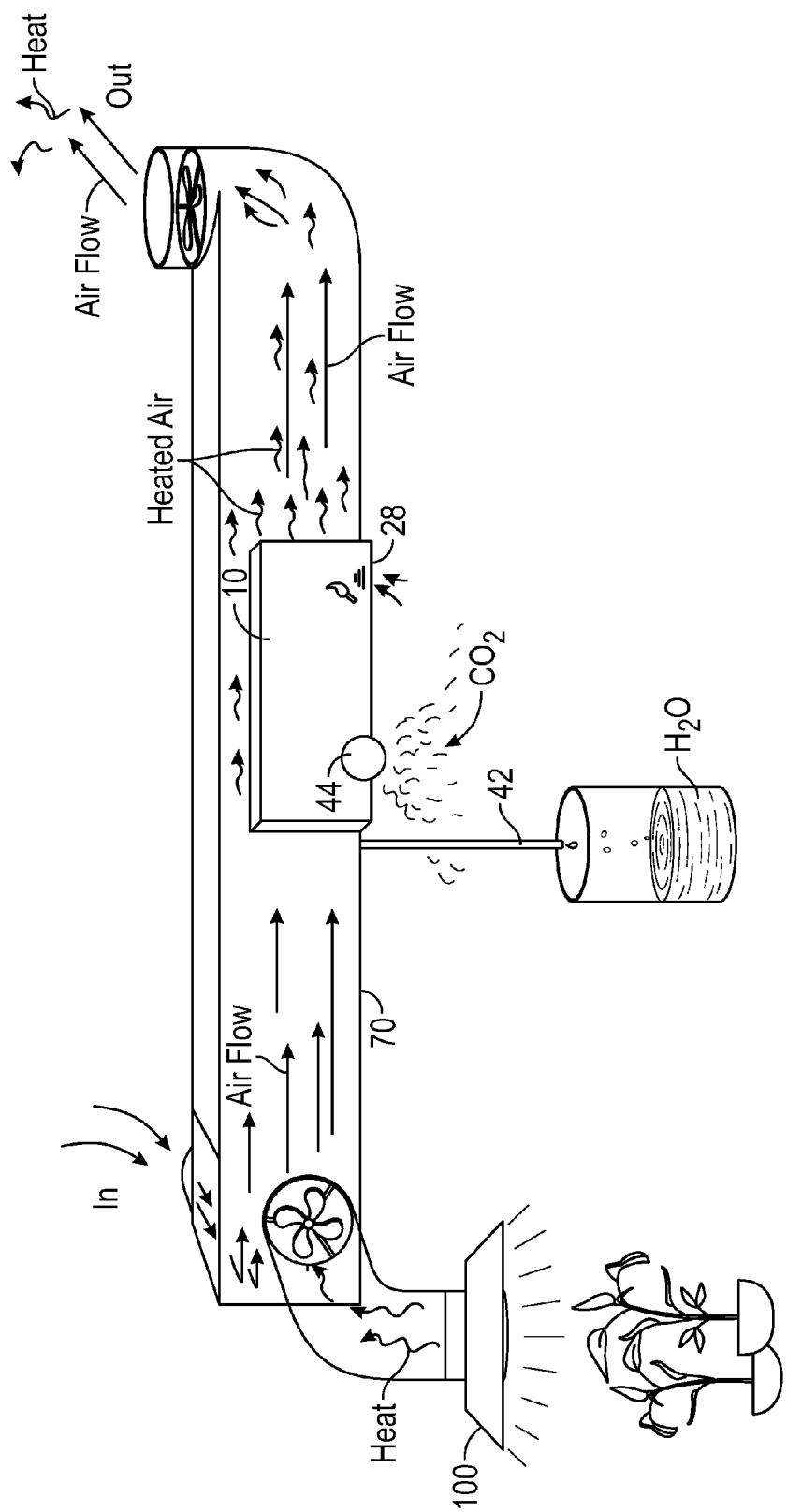
FIG. 2 is an in-use view.
Figure 3:
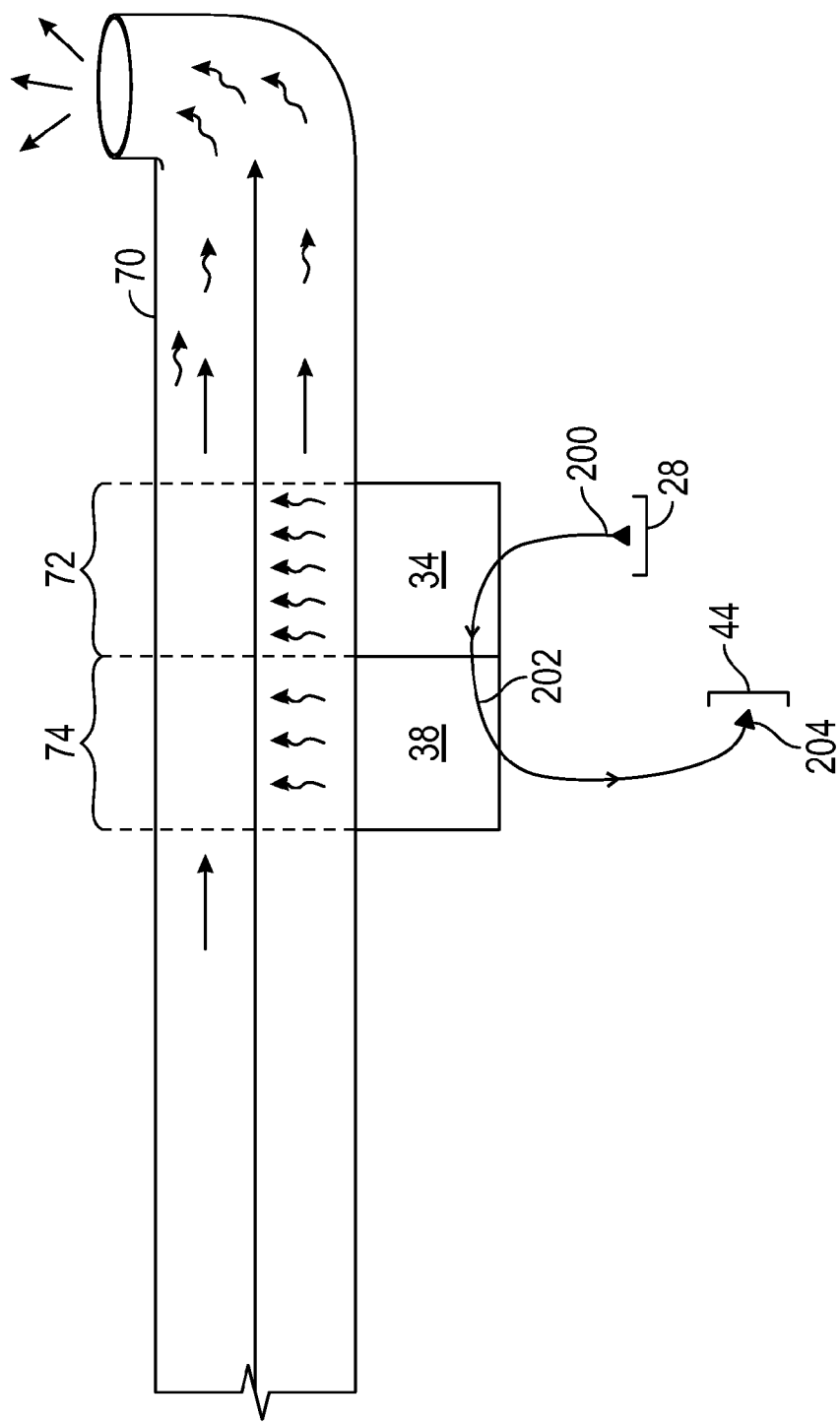
FIG. 3 is a diagrammatic view of a first and second heat exchanger arranged to conduct hear from exhaust gas circulated through a boustrophedonic flue in contrary direction to vented airflow through an existing ventilation system to which the present device is installed.

With reference now to the drawings, and in particular FIGS. 1 through 3 thereof, example of the instant short chain hydrocarbon combustor and carbon dioxide generator employing the principles and concepts of the present short chain hydrocarbon combustor and carbon dioxide generator and generally designated by the reference number 10 will be described.

Referring to FIGS. 1 through 3 a preferred embodiment of the short chain hydrocarbon combustor and carbon dioxide generator 10 is illustrated.

The present short chain hydrocarbon combustor and carbon dioxide generator 10 has been devised for integration into a grow space of an indoor grow facility wherein production of carbon dioxide (CO2) is sizable appropriate to maximizing yield of flowering, herbaceous, and other plants. CO2 is producible from clean and efficient combustion of short chain hydrocarbons, such as methane, ethane, propane, and butane, whereby oxidation of aliphatic and aromatic carbon produces CO2 according to the stoichiometric equations:

Methane: $CH_4 + 2O_2 \rightarrow CO_2 + 2H_2O$

Ethane: $2C_2H_6 + 7O_2 \rightarrow 4CO_2 + 6H_2O$

Propane: $C_3H_8 + 5O_2 \rightarrow 3CO_2 + 4H_2O$

Butane: $2C_4H_{10} + 13O_2 \rightarrow 8CO_2 + 10H_2O$

Since the present short chain hydrocarbon combustor and carbon dioxide generator 10 is devised for integration into an indoor grow facility, wherein use of lights for photosynthesis generates heat, 95% of heat produced by combustion interior to the short chain hydrocarbon combustor and carbon dioxide generator 10 is negated by air-to-air heat exchange with an existing ventilation system 70, which existing ventilation system 70 may be operative to exit heat generated at each of a plurality of grow lights 100 or in venting heat from the grow space proper, said heat transferred away from the grow space by said ventilation system 70, whereby cooled CO2 is producible for introduction into the grow space and water of combustion is condensable and collectable for use therein, as well.

The present short chain hydrocarbon combustor and carbon dioxide generator 10, therefore, is sized appropriate for integration into a grow cycle and readily installs into a ventilation system 70 already operative sustaining said grow cycle. The ventilation system 70 is contemplated to be in operation routing heat produced from lights 100 or venting the grow space proper. Thus it should be appreciated by anyone of ordinary skill in the art that the present short chain hydrocarbon combustor and carbon dioxide generator 10 includes structure devised particularly for expedient integration into a ventilation system 70 operative in a grow cycle and, further, is sized appropriate and particular for efficient production of CO2 from available methane, propane, and even ethane and butane sources common to urban infrastructure, at quantities sizable to demand.

The present short chain hydrocarbon combustor and carbon dioxide generator 10, therefore, includes a housing 500 installable into a ventilation system 70 conduit and connectable to an available supply of gas. The available supply of gas may be municipal gas provided through municipal infrastructure or gas available from pressurized storage installable proximal the present apparatus 10.

A high efficiency burner 20 is disposed interiorly to a sealed combustion chamber 22. The high efficiency burner 20 is fed by a gas valve 24, said gas valve 24 controllable by a demand relay 26 and ignitable by electric action of an igniter 48, whereby gas flow is regulated and continuously producible and combustible on demand. Oxygen is sourced from ambient air supply introducible into the combustion chamber 22 through at least one intake port 28, which may be open to the grow space (wherein oxygen is generable during photosynthesis) or sourced to an ambient area proximal the grow space or disposed in open communication with the ventilation system 70.

Daughter CO2 and water vapor from combustion are passed as exhaust gas into a boustrophedonic flue 30, said boustrophedonic flue 30 having at least one bend circuitous into at least one sealed chamber 32 interior to the short chain hydrocarbon combustor and carbon dioxide generator 10, by action of a fan 36, disposed in an exhaust manifold 50 and effective to maintain a negative pressure interior to said flue 30. Heat is transferred out of said exhaust gas into air drawn across the boustrophedonic flue 30 by airflow carried in the ventilation system 70 at a first heat exchanger 34, said heat thereby prevented from access to the grow space, and borne away from said grow space through the ventilation system 70. Approximately 70% of heat is exchanged into vented airflow in the ventilation system 70 at the first heat exchanger 34.

Exhaust gas is further drawn into a passive air-to-air second heat exchanger 38 having a plurality of fin members 52 for conduction of heat out of said exhaust gas into air vented through the ventilation system 70, wherein additional heat is transferred for dumping exterior the grow space, said heat maintained outside the grow space by action of some thermal barrier such as an insulated wall existing between the exterior and interior of the grow space.

Subsequent passage through the second heat exchanger 38, at least 95% of heat is transferred from the exhaust gas and condensation of water vapor is thereby effective at a water trap 40 for collection drainable at a wastewater conduit 42 for use or discard, as desired. Remaining CO2-rich exhaust gas is vented into the grow space through an exhaust port 44. CO2 is thus producible on demand, at desirable quantities, matched and sized for incorporation into plant tissue during photosynthesis whereby yield is increasable to a maximum.

It should be noted that airflow of exhaust gas from the air intake port 28, through the boustrophedonic flue 30, and out the exhaust port 44, is effected in contrary direction to airflow vented through the ventilation system 70, whereby a thermal gradient is maintained to effect the 95% reduction in heat in the exhaust gas. See FIG. 3. The first heat exchanger 34, therefore, is disposed to conduct heat from exhaust gas 200 into vented airflow 72 in a position downstream the ventilation system 70 relative the position whereat the second hear exchanger 38 conducts heat into vented airflow 74. Thus the thermal gradient is maintained, and heat is more efficiently exchanged at the second heat exchanger 38 into unheated airflow 74 to maximize heat reduction from the exhaust gas 202. Since heated airflow 72 in the ventilation system 70 then passes by the first heat exchanger 34, where exhaust gas 200 remains hotter than exhaust gas 202 introduced into the second heat exchanger 38, heat exchange remains effective to draw heat from the exhaust gas 200 into the vented airflow 72 at the first heat exchanger 34. A 75% reduction in heat is thereby effective at the first heat exchanger 34.

Thus exhaust gas 200 at entry to the boustrophedonic flue 30 has a highest temperature. Exhaust gas 202, at entry to the second heat exchanger 38, has a reduced temperature by conduction of a majority of heat exchanged into vented airflow 300 effected by passage at the first heat exchanger 34. Exhaust gas 204, at entry to the exhaust manifold 50, has a lowest temperature effected by further heat exchange to vented airflow 302 at the second heat exchanger 38 whereby at least a 95% reduction of heat is enabled and cooled exhaust gas is producible into the grow space as a CO2 enriched atmosphere.

The second heat exchanger 38 thus renders reduced temperature by conduction of heat into unheated airflow in the ventilation system 70 and by passage of cooled exhaust gas across a plurality of fin members 52 whereby a greater surface area for conduction of heat from the exhaust gas is enabled. Each the plurality of fin members 52 includes a planar expanse of conductive material arranged in parallel planes whereby heat is conductible into said fin members and transferable into venting airflow passing through the ventilation system 70.

In the embodiment depicted herein, the second heat exchanger 38 is vertically oriented and each of the plurality of fin members 52 is disposed vertically aligned in parallel planes whereby condensate from the exhaust gas is drainable for collection at a water trap 40 disposed immediately underlying the second heat exchanger 38 in the exhaust manifold 50. Thus cooled exhaust gas 200 enters the second heat exchanger 38 and descends as cooling airflow into the exhaust manifold 50 where water is precipitated during cooling of the exhaust gas and collected at the water trap 40. The water trap 40 may include a sloped surface 52 whereby liquid water is drainable into wastewater conduit 42 for collection, discard, or reuse.

A carbon dioxide sensor 300 may be disposed in operational communication with the demand relay 26 at the high-efficiency burner 20 whereby a desired atmospheric concentration of CO2, sensible at the carbon dioxide sensor, is maintainable and combustion of gas at the combustion chamber 22 thereby controllable to exhaust known quantities of CO2 and enrich the ambient atmosphere to sustain the desired concentration of CO2 appropriate to maximization of yield.

The present short chain hydrocarbon combustor and carbon dioxide generator 10 is thus readily integrated into an existing ventilation system and usable to produce CO2 to maintain a desired atmospheric concentration of CO2 interior to the grow space without appreciably impacting the thermal load or relative humidity of the grow space. Yield is thus calculable in terms of weight from quantities of CO2 delivered into the grow space, producible upon demand, as desired.

What is claimed is:

1. A short chain hydrocarbon combustor and carbon dioxide generator connectable to an existing gas supply and installable into an existing ventilation system venting an interior grow space, said short chain hydrocarbon combustor and carbon dioxide generator comprising:
- a housing installed into an existing ventilation system venting airflow from an interior grow space, said housing connected to an existing gas supply;
- a burner disposed in the housing in open communication with an intake port, said intake port disposed in open communication with an ambient air supply;
- a gas valve disposed in operative communication with the high-efficiency burner;
- a demand relay disposed in operational control of the gas valve;
- a carbon dioxide sensor disposed sensible of an atmospheric concentration of CO2 within the grow space, said carbon dioxide sensor disposed in operational communication with the demand relay;
- a boustrophedonic flue disposed circuitous into a sealed chamber interiorly enclosed within the housing;
- a first heat exchanger disposed to conduct heat from exhaust gas passable through the boustrophedonic flue into airflow vented through the ventilation system;
- a second heat exchanger disposed to conduct heat from exhaust gas passable through the boustrophedonic flue into airflow vented through the ventilation system;
- an exhaust manifold disposed in open communication with the boustrophedonic flue; and
- a fan disposed in the exhaust manifold, said fan disposed to maintain negative pressure interior to the boustrophedonic flue and force exhaust gas drawn therethrough out an exhaust port;
- wherein gas is combustible upon demand to produce CO2 enriched exhaust gas producible into a grow space without increasing the ambient temperature therein and a target concentration of atmospheric CO2 is maintainable within the grow space.

2. The short chain hydrocarbon combustor and carbon dioxide generator of claim 1 wherein the first heat exchanger is disposed to conduct heat into airflow in the ventilation system downstream relative airflow in the ventilation system into which heat is conducted at the second heat exchanger, whereby a further reduction in heat is effective at the second heat exchanger and at least a 95% reduction in heat in the exhaust gas is attainable before introduction into the grow space.

3. The short chain hydrocarbon combustor and carbon dioxide generator of claim 2 wherein the second heat exchanger further includes a plurality of fin members disposed in parallel planes whereby the surface area over which heat is conductible into airflow venting through the ventilation system is increased relative the surface area of the first heat exchanger.

4. The short chain hydrocarbon combustor and carbon dioxide generator of claim 3 wherein the second heat exchanger is disposed in vertical orientation overlying the exhaust manifold whereby condensate precipitated at the second heat exchanger is drainable by action of gravity into the exhaust manifold.

5. The short chain hydrocarbon combustor and carbon dioxide generator of claim 4 further comprising a water trap disposed in the exhaust manifold for collection of condensate drained from the second heat exchanger.

6. The short chain hydrocarbon combustor and carbon dioxide generator of claim 5 further comprising a wastewater conduit disposed in open communication with the water trap whereby liquid water collectable at the water trap is recoverable from the wastewater conduit for reuse or disposal.

7. A short chain hydrocarbon combustor and carbon dioxide generator connectable into municipal gas lines and installable into an existing ventilation system venting an interior grow space, said short chain hydrocarbon combustor and carbon dioxide generator comprising:
- a housing installed into an existing ventilation system and connected to an existing gas supply;
- an intake port disposed upon the housing, said intake port disposed in open communication with an ambient air supply;
- a combustion chamber disposed in the housing, said combustion chamber drawing air supply from the intake port;
- a high-efficiency burner disposed in the combustion chamber, said high-efficiency burner disposed in operational communication with a gas valve, said gas valve operable by action of a demand relay wherein combustion of gas produces exhaust gas interior to the combustion chamber;
- a boustrophedonic flue disposed in open communication with the combustion chamber, said boustrophedonic flue having at least one bend, said boustrophedonic flue thereby circuitous into a sealed chamber disposed interior to the housing;
- a first heat exchanger disposed interior to the sealed chamber, said first heat exchanger conductive of heat from the exhaust gas and into airflow forcible through the existing ventilation system to which the housing is installed;
- a second heat exchanger disposed interior to the sealed chamber, said second heat exchanger disposed downstream from the first heat exchanger, said second heat exchanger having a plurality of fins to effect heat exchange from the exhaust gas into airflow in the existing ventilation system at a position upstream of airflow in the ventilation system vented to contact with the first heat exchanger;
- an exhaust manifold disposed in open communication with the second heat exchanger, said exhaust manifold venting exhaust gas out an exhaust port;
- a fan disposed in the exhaust manifold proximal the exhaust port, said fan disposed to maintain negative pressure throughout the boustrophedonic flue and force exhaust gas out the exhaust port;
- a water trap disposed in the exhaust manifold in position to collect condensate from cooled exhaust gas;
- a wastewater conduit disposed to drain water collected at the water trap; and
- a carbon dioxide sensor disposed sensible of atmospheric concentration of CO2 readable in the interior grow space, said carbon dioxide sensor disposed in operational communication with the gas valve and the high-efficiency burner;
- wherein short-chain hydrocarbons are combustible upon demand to sustain a desired concentration of CO2 in the grow space by venting of cooled, dehydrated exhaust gas into said grow space and heat producible at combustion is transferable into vented airflow excluded from the grow space by action of an existing ventilation system.

8. The short chain hydrocarbon combustor and carbon dioxide generator of claim 7 wherein the second heat exchanger further includes a plurality of fin members disposed in parallel planes whereby the surface area over which heat is conductible into airflow venting through the ventilation system is increased relative the surface area of the first heat exchanger.

9. The short chain hydrocarbon combustor and carbon dioxide generator of claim 8 wherein the second heat exchanger is disposed in vertical orientation overlying the exhaust manifold whereby condensate precipitated at the second heat exchanger is drainable by action of gravity into the exhaust manifold.

10. A short chain hydrocarbon combustor and carbon dioxide generator installable into an existing ventilation system of an interior grow space, said short chain hydrocarbon combustor and carbon dioxide generator comprising:
- a high-efficiency burner disposed interior to a combustion chamber proximal an intake port;
- a gas valve disposed in operational communication with the high-efficiency burner;
- a demand relay disposed in operational communication with the gas valve, said demand relay controlling production of gas through the gas valve;
- a boustrophedonic flue disposed in open communication with the combustion chamber, said boustrophedonic flue having at least one bend therein circuitous into a sealed chamber interiorly enclosed within a housing;
- a first heat exchanger disposed interior to the sealed chamber, said first heat exchanger conductive of heat from exhaust gas producible at the burner into airflow forcible through the existing ventilation system to which the housing is installed;
- a vertically oriented second heat exchanger disposed interior to the sealed chamber downstream the boustrophedonic flue from the first heat exchanger, said second heat exchanger including a plurality of fins disposed in vertically oriented parallel planes, said second heat exchanger disposed to conduct heat into vented airflow upstream of the vented airflow conducting heat from the first heat exchanger;
- an exhaust manifold disposed in open communication with the boustrophedonic flue;
- a fan disposed in the exhaust manifold, said fan effective to maintain negative pressure interior to the boustrophedonic flue and thereby sustain inflow of exhaust gas producible at the high-efficiency burner for expulsion from the exhaust manifold subsequent heat exchange effected at each of the first and second heat exchangers;
- an exhaust port disposed upon the exhaust manifold, said exhaust port disposed to vent exhaust gas into the interior grow space;
- a water trap disposed at the exhaust manifold in a position underlying the second heat exchanger, said water trap collective of water precipitated from the cooled exhaust gas by action of gravity;
- a wastewater conduit disposed for drainage of water collected at the water trap; and
- a CO2 sensor disposed in open communication with the interior grow space, said CO2 sensor disposed in operational communication with the demand valve and high-efficiency burner;
wherein CO2 is producible on demand to sustain a desired atmospheric concentration of CO2 interior to the grow space by combustion of short-chain hydrocarbons and heat of combustion is excludable from the interior grow space by air-to-air heat exchange with airflow evacuating through an existing ventilation system.

* * * * *